Oct. 31, 1939.  A. HUET  2,177,887
APPARATUS FOR SHIELDING A BODY FROM FLUID CURRENTS
Filed June 23, 1936
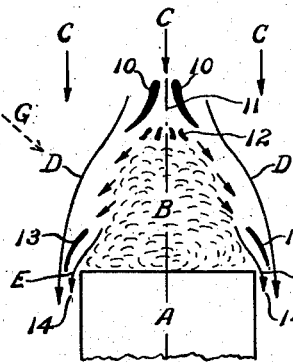
Fig.1
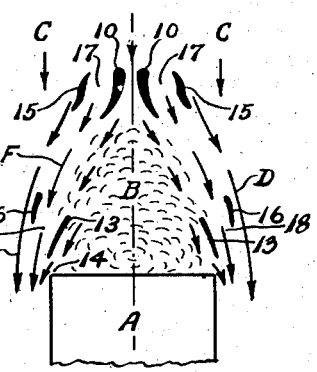
Fig.2
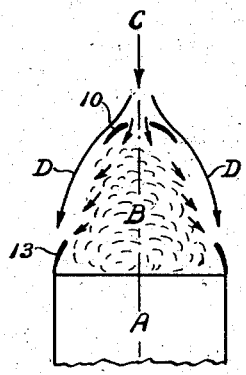
Fig.3
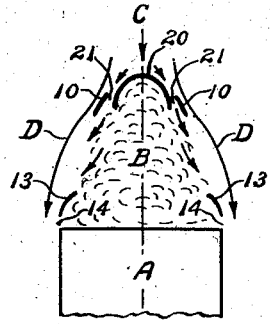
Fig.4
Fig.8
INVENTOR
ANDRE HUET
BY O. V. Thiele
ATTORNEY Patented Oct. 31, 1939

2,177,887

UNITED STATES PATENT OFFICE 2,177,887

APPARATUS FOR SHIELDING A BODY FROM FLUID CURRENTS

André Huet, Paris, France

Application June 23, 1936, Serial No. 86,714
In France August 10, 1935

7 Claims. (Cl. 105—2)

In my copending application, Serial No. 757,026, filed December 11, 1934, I have disclosed methods and apparatus for decreasing the resistance to the forward travel of a moving body through a surrounding fluid by enveloping a part or all of the body with a body of fluid which shields and protects the moving body. This protective fluid body is made up of the fluid, such as air, through which the moving body travels and accompanies it to provide a surface on which the currents of fluid glide in their course along the moving body. Thus, the surface of the protective fluid body provides a "stream-lined" effect for the moving body without actually stream-lining the physical parts of the latter. In order to retain the advantages of the reduction of resistance obtained by the protective air body it is desirable that the latter be disturbed as little as possible by wind or other fluid currents moving toward the protected body, especially currents coming from a direction at an angle to its path of travel.

The present invention relates to deflecting apparatus for assuring the stability of the protective body of fluid which accompanies the moving body protected thereby. The invention is characterized by the combination of two sets of deflecting devices acting conjointly to provide and maintain the said protective fluid body. One set of deflecting devices is located at a distance forward of the front end of the moving body, or whatever part thereof it is desired to protect, and consists of deflecting devices arranged to turn fluid currents away from the path of the moving body and to create rearwardly of the deflecting devices a protective body or shield of fluid such as air. The protective body of air may be substantially stationary with respect to the moving body or in the form of an aero-dynamic shield having a pressure sufficient to maintain the deflected currents of fluid away from the body. The protective air shield is formed in front of the moving body, or part thereof which is to be protected, by providing openings in deflecting devices or by spacing them laterally of the longitudinal axis of the body to admit undeflected air to the space rearwardly thereof. To avoid eddy currents in the protective shield of air a number of supplementary deflecting devices may be associated with the main deflectors.

The second set of deflecting devices is located rearwardly of the first and adjacent the front of the moving body or that portion thereof which is to be protected and acts to maintain the streams of air in the path to which they have been deflected by the first apparatus so that the form of the protective shield of air may be maintained, particularly against the effect of angularly attacking wind currents. These deflecting devices are arranged to provide passages for controlling the flow of minor currents of air from the protective air body, such flow being occasioned, for example, by the movement of the deflected streams of air which by suction or a friction effect on the surface of the protective air body withdraw air therefrom. The air flowing through these passages may be directed thereby against the deflected air streams to assist in maintaining them away from the surface of the moving body.

Deflecting devices constructed and arranged in accordance with the invention may be utilized to protect openings exposed to the wind, protective glasses such as wind shields, windows, irregular surface portions of the moving body or to assure the maintenance in any desired location of a calm zone; for example, to protect the pilot or gun crew of an airplane against the effect of the wind, or for other analogous purposes. Several sets of deflecting devices embodying the invention may be utilized in series, in parallel, or in series parallel. Moreover, they may be regulatable either manually or automatically by the wind blowing with respect to the moving body like wind vanes.

The air withdrawn from the protective shield of air after functioning to sustain the deflecting streams may be employed for other purposes such for example to cool a motor or a radiator.

The manner in which the invention is carried out will best be understood upon consideration of the following description of the illustrative embodiments thereof when taken in conjunction with the accompanying drawing, in which Figs. 1 to 4 are diagrammatic plan views showing several arrangements of deflecting devices in accordance with the invention for protecting a moving body.

In Fig. 1 the moving body is represented by the rectangle A. In a central position forwardly of the front of the body a pair of deflecting devices 10 are arranged in transversely spaced relation and symmetrically with respect to the longitudinal axis of the body A. These deflecting devices are inclined outwardly and rearwardly with respect to the axis of the body so that fluid currents C moving with respect thereto are deflected outwardly away from the front end thereof as indicated by the arrows D. The spacing of the deflectors 10 forms a passage 11 through which undeflected fluid encountered by the body passes to create a body of air B rearwardly of the deflectors 10 and acting to shield the body A against the fluid currents C. When the deflectors are arranged as illustrated in Fig. 1, a rearwardly diverging passage is formed so that the undeflected fluid in passing therethrough expands and as its velocity is decreased its static pressure becomes greater so that it acts dynamically to maintain the fluid currents C away from the body A. A series of supplementary deflectors 12 are mounted between the deflectors 10 near their rear ends and act to subdivide passage 11 so fluid currents passing therethrough do not create eddies or produce turbulence in the protective fluid body B.

In order that the fluid currents C may not deform the protective body of air B by pushing it partly to one side, and thus lessen its efficiency, if they come from a direction at an angle to the path of travel as indicated by the arrow G a second pair of deflecting devices 13 is mounted near the side edges of the body A at the front thereof. These deflectors act to maintain the deflected streams of fluid D in the courses to which they have been diverted by the deflectors 10. As illustrated, the deflectors 13 are positioned further outwardly than the deflectors 10 and the rear edges are spaced from the surface of the moving body A to form passages 14 through which currents E of fluid pass to flow along the sides of the body A between its surface and the deflected currents of fluid D.

The deflectors 13 may be disposed with respect to the body A so that fluid passing between them and the body is directed toward the deflected streams D to maintain these streams away from the body.

In Fig. 2 additional deflectors 15, 16 are associated with the primary deflectors 10, and secondary deflectors 13, 14, respectively, to form passages 17, 18 providing secondary currents F of deflected fluid acting to further protect the fluid body B.

In Fig. 3 the deflectors 10 have a convex outer surface instead of concave, as in Figs. 1 and 2, and the deflectors 13 have their rear edges joined to the side edges of the moving body so that they constitute forward extensions of the sides therof. If desired, supplementary deflectors 12 may be provided as in Fig. 1. The rear edges of the deflectors 13 might also be aligned with the side edges of the moving body as shown but spaced forwardly therefrom to provide passages for directing currents of fluid against the streams of deflected fluid to sustain the latter, as in Fig. 2.

In Fig. 4 a parabolic deflector 20 is positioned between the deflectors 10 and extends forwardly beyond the latter in a position on the axis of the moving body. The deflectors 10 are spaced laterally from the deflector 20 to provide passages 21 directing currents to form the protective shield B. The deflectors 10 might be spaced more closely together and deflector 20 disposed behind them.

Although illustrative embodiments of the invention have been shown in the drawing and described in detail herein, deflecting devices embodying the invention may be applied to protect all or parts of other types of moving or stationary bodies and it is to be understood that there are many variations and changes which may be made without departing from the invention. Therefore, it is intended that all such variations and changes be included within the scope of the appended claims.

What I claim is:

1. Apparatus for protecting the front end of a moving body from the effects of currents of fluid that move with respect to said body comprising: deflecting means positioned in spaced relation centrally and forwardly of the front end of said body and extending at a rearwardly inclined angle to the longitudinal center line of said body to deflect some of the currents of fluid outwardly away from said front end and to create a body of air located rearwardly of said deflecting means, said body of air acting to shield said front end; and other deflecting means positioned rearwardly of said first deflecting means and adjacent said front end and disposed so as to prevent the deflected currents of fluid reverting to their natural course before passing said front end.

2. Apparatus for protecting a front end of a body against the effects of fluid currents that move with respect thereto comprising: a pair of spaced deflecting members mounted centrally forwardly of said front end and arranged so as to deflect part of said fluid currents outwardly away from said front end, said deflecting members being disposed with respect to each other so as to form a passage diverging rearwardly with respect to the longitudinal axis of said body to admit undeflected fluid to the space rearwardly of said members adjacent said front end for creating a fluid body shielding said front end; and other deflecting members positioned rearwardly of said first members and adjacent the sides of the front end of said body for acting upon said deflected currents of fluid to maintain them in their deflected courses until they have passed the front end of said body.

3. Apparatus for reducing the resistance to the movement of a body through a surrounding fluid comprising: a pair of deflecting members mounted symmetrically with respect to the longitudinal axis of said body in a central position forwardly of the front end thereof and inclined outwardly and rearwardly with respect to said axis for deflecting part of the fluid currents encountered by the body outwardly away from said front end to flow rearwardly along and outwardly of the surface of said body, said members being disposed to form a passage for admitting undeflected fluid therebetween to create a relatively stationary body of fluid forwardly of and shielding the front end of said body; and other deflecting members mounted adjacent the periphery of the front end of said body to maintain the said deflected currents of fluid in their deflected courses.

4. Apparatus for reducing the resistance caused by fluid currents encountered in, or created as a result of, the movement of a body through a surrounding fluid comprising; a pair of deflecting members mounted symmetrically with respect to the longitudinal axis of said body in a central position forwardly of the front thereof and inclined outwardly and rearwardly with respect to said axis for deflecting part of the fluid currents outwardly away from the front of said body, said deflecting members being disposed in spaced relation to form a rearwardly divergent passage through which undeflected fluid flows to expand in the space between the front of said body and said deflecting members and create therein a body of fluid that is substantially stationary with respect to said moving body and which shields the front of the latter against the effect of said fluid currents; and another pair of deflecting members mounted adjacent the front of said body and disposed in transversely spaced relation rearwardly of and outwardly with respect to said first deflecting members and acting to maintain the deflected fluid currents in the courses to which they are diverted by the latter until they have passed the front end of said body for preventing disturbance of the stability of said fluid body.

5. Apparatus for protecting a body against the effects of fluid currents that move with respect thereto comprising, a pair of deflecting members mounted symmetrically with respect to the longitudinal axis of said body in a central position forwardly of the front thereof and disposed in outwardly and rearwardly inclined relation with respect to said axis for deflecting part of the fluid currents outwardly away from the front of said body, said deflecting means being formed with a passage for admitting undeflected fluid to the space rearwardly thereof to create therein a body of fluid located forwardly of the front of said body and shielding the latter against the effect of said fluid currents; and other deflecting means mounted rearwardly of said first deflecting means and positioned at the front end of said body for maintaining the fluid currents deflected by said first deflecting means in their deflected courses until they have passed the front end of said body.

6. Apparatus for protecting a body against the effects of fluid currents that move with respect thereto comprising; a pair of deflecting members mounted symmetrically with respect to the longitudinal axis of said body in a central position forwardly of the front thereof and disposed in outwardly and rearwardly inclined relation with respect to said axis for deflecting part of the fluid currents outwardly away from the front of said body, said deflecting means being formed with a passage for admitting undeflected fluid to the space rearwardly thereof to create therein a body of fluid located forwardly of the front of said body and shielding the latter against the effect of said fluid currents; other deflecting means mounted rearwardly of said first deflecting means and positioned at the front end of said body for maintaining the fluid currents deflected by said first deflecting means in their deflected courses; and a plurality of supplementary deflectors mounted in spaced relation rearwardly of and between said first mentioned deflecting members for subdividing the said passage therebetween to prevent turbulence within said fluid body by the flow of fluid to the latter through said passage.

7. Apparatus for protecting a body against the effects of fluid currents that move with respect thereto comprising; a pair of deflecting members mounted symmetrically with respect to the longitudinal axis of said body in a central position forwardly of the front thereof and disposed in outwardly and rearwardly inclined relation with respect to said axis for deflecting part of the fluid currents outwardly away from the front of said body, said deflecting means being formed with a passage for admitting undeflected fluid to the space rearwardly thereof to create therein a body of fluid located forwardly of the front of said body and shielding the latter against the effect of said fluid currents; other deflecting means mounted rearwardly of said first deflecting means and positioned at the front end of said body for maintaining the fluid currents deflected by said first deflecting means in their deflected courses; and other deflecting means positioned adjacent each of said deflecting members and disposed to form therewith a rearwardly converging passage admitting undeflected air and directing it against the streams of deflected fluid on the side toward said axis to prevent collapse of said streams of fluid toward the path of said body.

ANDRÉ HUET.